United States Patent
Turjeman et al.

(10) Patent No.: US 10,494,828 B2
(45) Date of Patent: Dec. 3, 2019

(54) POOL CLEANER WITH DUAL FILTER

(71) Applicant: Aquatron Robotic Technology Ltd., Afula (IL)

(72) Inventors: Omer Turjeman, Afula (IL); Shahar Schloss, Haifa (IL)

(73) Assignee: Aquatron Robotic Technology Ltd., Afula (IL)

( * ) Notice: Subject to any disclaimer, the term of this patent is extended or adjusted under 35 U.S.C. 154(b) by 0 days.

(21) Appl. No.: 15/907,296

(22) Filed: Feb. 28, 2018

(65) Prior Publication Data
US 2019/0264459 A1    Aug. 29, 2019

(51) Int. Cl.
| | |
|---|---|
| E04H 4/16 | (2006.01) |
| B01D 29/56 | (2006.01) |
| F04D 29/70 | (2006.01) |
| F04D 13/08 | (2006.01) |
| F04D 29/22 | (2006.01) |
| F04D 29/18 | (2006.01) |

(52) U.S. Cl.
CPC .......... E04H 4/1654 (2013.01); B01D 29/56 (2013.01); F04D 13/086 (2013.01); F04D 29/708 (2013.01); F04D 29/181 (2013.01); F04D 29/22 (2013.01)

(58) Field of Classification Search
CPC ... E04H 4/1654; F04D 13/086; F04D 29/708; F04D 29/181; F04D 29/22; B01D 29/56
USPC ..... 210/167.16, 167.17, 416.1, 416.2; 15/1.7
See application file for complete search history.

(56) References Cited

U.S. PATENT DOCUMENTS

| | | | | |
|---|---|---|---|---|
| 5,842,243 | A * | 12/1998 | Horvath | E04H 4/1636 15/1.7 |
| 6,942,790 | B1 * | 9/2005 | Dolton | E04H 4/1636 134/168 R |
| 6,971,136 | B2 * | 12/2005 | Horvath | E04H 4/1654 15/1.7 |
| 9,909,332 | B2 * | 3/2018 | Maggeni | C02F 1/001 |
| 2002/0104790 | A1 * | 8/2002 | Lincke | B01D 29/27 210/167.16 |
| 2003/0201218 | A1 * | 10/2003 | Henkin | E04H 4/1654 210/167.16 |
| 2010/0065482 | A1 * | 3/2010 | Sumonthee | E04H 4/1654 210/167.1 |
| 2012/0074050 | A1 * | 3/2012 | Rief | E04H 4/1654 210/167.16 |

(Continued)

FOREIGN PATENT DOCUMENTS

EP    3382126 A1 *  3/2018

*Primary Examiner* — Fred Prince
(74) *Attorney, Agent, or Firm* — Pearl Cohen Zedek; Latzer Baratz LLP

(57) ABSTRACT

A pool cleaner includes a housing with at least one fluid inlet and at least one fluid outlet, and a propulsion system for propelling the pool cleaner within a pool. A suction system includes a motorized pump and is configured to draw liquid containing debris from the pool through the fluid inlet, and to expel the liquid back into the pool through the fluid outlet. A first filter is located between the fluid inlet and the pump, and a second filter is located downstream of the pump. The first filter is configured to trap debris pieces that are larger than a predetermined size to prevent the debris pieces from flowing to the pump, and the second filter is configured to trap the debris that has passed through the first filter.

16 Claims, 4 Drawing Sheets

(56) References Cited

U.S. PATENT DOCUMENTS

| | | | |
|---|---|---|---|
| 2015/0191925 A1* | 7/2015 | Maggeni | C02F 1/001 |
| | | | 210/85 |
| 2015/0337555 A1* | 11/2015 | Hui | E04H 4/1636 |
| | | | 15/1.7 |
| 2016/0032604 A1* | 2/2016 | Chen | E04H 4/1636 |
| | | | 210/167.16 |
| 2016/0060887 A1* | 3/2016 | Tryber | E04H 4/1654 |
| | | | 15/1.7 |

* cited by examiner

POOL CLEANER WITH DUAL FILTER

FIELD OF THE INVENTION

The present invention relates to pool cleaners. More particularly, the present invention relates to a pool cleaner with a dual filter.

BACKGROUND OF THE INVENTION

Electrically powered swimming pool cleaners that clean a pool, either autonomously or under the control of an operator, are well known. Such cleaners typically include a wheeled or tracked propulsion system for propelling the cleaner about the interior of the pool. A suction system typically includes a motorized impeller or other type of pump for drawing water from the pool into an inlet and through a filter. The filter traps debris that is suspended in the inflowing water. The suction system then expels the filtered water via an outlet back into the pool.

Debris that is removed from the water may include objects and particles of different sizes. For example, larger debris may include leaves, pebbles or stones, plastic bags, and other objects that may be blown, dropped, washed, or tracked into pool. Smaller debris may include dirt particles or other small particulate matter that may be tracked, washed, or blown into the pool.

SUMMARY OF THE INVENTION

There is thus provided, in accordance with an embodiment of the present invention, a pool cleaner including: a housing, including at least one fluid inlet and at least one fluid outlet; a propulsion system for propelling the pool cleaner within a pool; a suction system including a motorized pump, the suction system being configured to draw liquid containing debris from the pool through the at least one fluid inlet, and to expel the liquid back into the pool through the at least one fluid outlet; a first filter located between the at least one fluid inlet and the pump; and a second filter located downstream of the pump, wherein the first filter is configured to trap debris pieces that are larger than a predetermined size to prevent the debris pieces from flowing to the pump, and the second filter is configured to trap the debris that has passed through the first filter.

Furthermore, in accordance with an embodiment of the present invention, the pump includes an axial-flow pump with a propeller that is located upstream of a motor of the pump.

Furthermore, in accordance with an embodiment of the present invention, the pump is an axial-flow pump including a propeller that is located downstream of a motor of the pump.

Furthermore, in accordance with an embodiment of the present invention, the pump includes a second propeller that is located upstream of the motor.

Furthermore, in accordance with an embodiment of the present invention, the pump includes an axial-flow pump with a propeller, and the pump motor shaft is configured to generate torque about an axis that is substantially perpendicular to an axis of rotation of the propeller.

Furthermore, in accordance with an embodiment of the present invention, a transmission for transmitting torque from the motor to the propeller includes a bevel gear.

Furthermore, in accordance with an embodiment of the present invention, the pump includes a centrifugal pump.

Furthermore, in accordance with an embodiment of the present invention, an impeller of the centrifugal pump is configured to rotate about a horizontal axis.

Furthermore, in accordance with an embodiment of the present invention, an impeller of the centrifugal pump is configured to rotate about a vertical axis.

Furthermore, in accordance with an embodiment of the present invention, the pool cleaner includes a duct to connect an inlet of the centrifugal pump to an outlet of the first filter, or a duct to connect an outlet of the centrifugal pump to an inlet of the second filter.

Furthermore, in accordance with an embodiment of the present invention, an inlet opening to the first filter is provided with a one-way valve to enable inflow of the liquid to the first filter via the inlet opening and to prevent outflow of the liquid from the first filter via the inlet opening.

Furthermore, in accordance with an embodiment of the present invention, an inlet opening to the second filter is provided with a one-way valve to enable inflow of the liquid to the second filter via the inlet opening, and to prevent outflow of the liquid from the second filter via the inlet opening.

Furthermore, in accordance with an embodiment of the present invention, the second filter is at least partially enclosed within the housing.

Furthermore, in accordance with an embodiment of the present invention, the second filter is entirely outside the housing.

Furthermore, in accordance with an embodiment of the present invention, the second filter is contoured to conform to a shape of a top surface of the housing.

Furthermore, in accordance with an embodiment of the present invention, an inlet opening to the second filter is configured to fit to and maintain frictional contact with an outlet of the housing.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
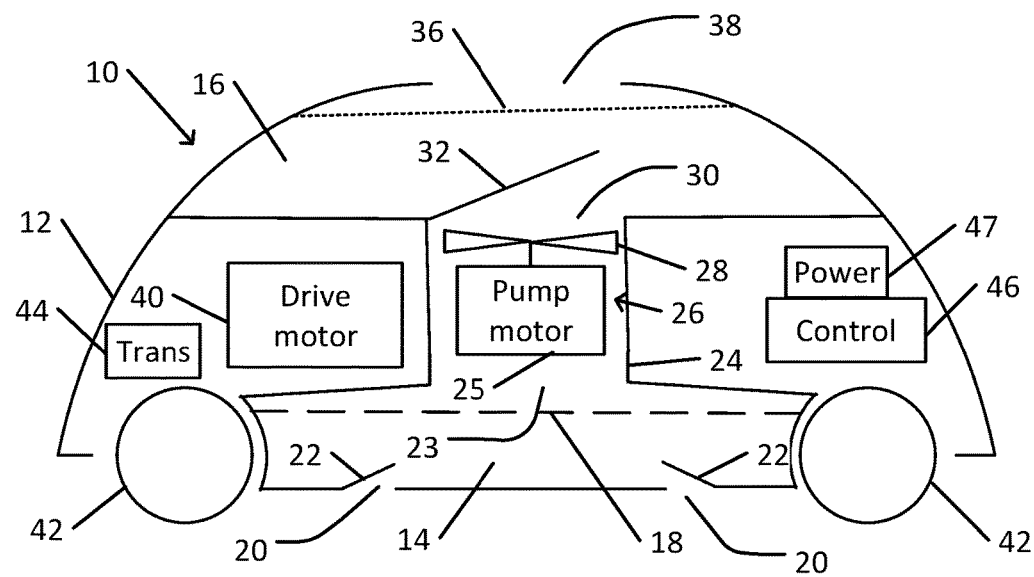
FIG. 1 schematically illustrates a pool cleaner with a dual filter, in accordance with an embodiment of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

In accordance with an embodiment of the present invention, a pool cleaner is configured to operate when fully or partial submerged in water or another liquid in a pool or container that is fully or partially filled with the liquid. The pool cleaner includes a suction system that includes a pump that is located between two filters, an inlet filter and an outlet filter. The pump is configured to impel or pump the liquid from the pool so that the liquid flows downstream from the pool through the inlet filter to the pump, and outward through the outlet filter back into the pool.

The inlet filter is located adjacent to a liquid inlet that is typically located on a bottom surface of the pool cleaner (e.g., a surface of the pool cleaner that is configured to face a surface of the pool floor or wall that is being cleaned by the pool cleaner), or on a side of the pool cleaner near the bottom surface. The liquid inlet is configured to enable inflow of a liquid from the pool that is being cleaned through the inlet filter and toward the pump. The inlet filter is thus upstream of the pump. The inlet filter includes a coarse mesh for trapping large pieces of debris while enabling particulate debris to pass. As used herein, large pieces of debris include those pieces of debris that are so large that contact of those pieces with the pump is to be avoided. For example, one or more large pieces of debris could interfere with operation of the pump (e.g., by clogging a port of the pump or interfering with motion of an impeller or other moving part of the pump, or by colliding with and damaging one or more components of the pump). Debris particles (e.g., those particles of debris that are to be removed from the liquid by the pool cleaner but are sufficiently small so as to be allowed to flow through the pump) may pass through the coarse mesh and toward the pump.

An inlet for enabling passage of liquid into the inlet filter may include a one-way access valve. The one-way access valve may include a flap, door, movable cover, duckbill mechanism, or another mechanism for limiting flow to one direction. The one-way access valve may be configured to enable inflow of liquid from the pool and through the inlet, while preventing any backflow of liquid, or of trapped pieces of debris, from flowing backward from the inlet filter and into the pool.

Liquid that has flowed inward through the inlet filter is directed by a system of one or more inlet ducts to the pump. For example, the pump may include one or more axial-flow pumps (e.g., with one or more axial impellers in the form of propellers), centrifugal impellers, or other pumping mechanisms, for forcing liquid from the inlet toward the pump. Liquid is forced by the pump via one or more outlet ducts to the outlet filter.

An outlet filter is located downstream from the pump at an outlet from the pool cleaner to the pool. The outlet filter includes a fine mesh, i.e., a mesh that is finer than the coarse mesh of the inlet filter, and that is configured to trap all debris (e.g., that was not previously trapped by the inlet filter), including debris particles, that is to be removed from the liquid.

An inlet opening for enabling passage of liquid flowing downstream from the pump into the outlet filter may include a one-way access valve (e.g., flap, door, movable cover, duckbill mechanism, or another mechanism for limiting flow to one direction). The one-way access flap may be configured to enable inflow of liquid from the pump and into the outlet filter, while preventing any backflow of liquid, or of trapped particles of debris, from flowing backward from the outlet filter toward the pump.

The pool cleaner may include a propulsion system for propelling the pool cleaner within the pool. For example, the pool cleaner may include one or more motorized wheels or tracks that are configured to propel the pool cleaner along a surface (e.g., a floor or wall) of the pool. Alternatively or in addition, the pool cleaner may include one or more other propulsion mechanisms (e.g., propellers, fins or wings, liquid jets, or other propulsion mechanisms) for propelling the pool cleaner along the surface of, or otherwise within, the pool.

In some cases, a pool cleaner may include two or more separate motors for separately operating components of the propulsion system (e.g., in some cases, separate motors for powering separate wheels, sets of wheels, or other components of the propulsion system) and the pumps of the suction system. In other cases, a single motor may operate both one or more components of the propulsion system and one more components of the suction system. One or more transmissions may be configured to transmit a torque that is generated by the motor to one or more of the wheels or pump. In some cases, the transmission may include a bevel gear or other mechanism enabling a motor that rotates about one axis to transmit torque to a wheel or pump axis that is oriented along a different axis.

A housing of the pool cleaner may enclose one or more components of the pool cleaner. For example, the housing may enclose one or more motors, one or more controllers or control circuitry, one or more pumps, and one or both of the inlet filter and the outlet filter. The housing may include one or more inlet openings, and, in some cases, an exterior outlet opening for enabling flow of liquid from the outlet filter out into the pool.

Although reference is made herein, for convenience, to a pool, the term "pool" should be understood as referring to any type of tank or container that is suitable for cleaning by a pool cleaner as described herein. Similarly, any use of the term "water" should be understood as referring to any liquid that is filling the pool, and whose properties (e.g., sufficiently low viscosity, or other properties) enable a container of that liquid to be cleaned by a pool cleaner as described herein.

A pool cleaner with a dual filter may be advantageous over other types of pool cleaners, e.g., that include a single filter. Such a single filter is generally located upstream of the pump, in order to prevent pieces of debris that could be harmful to the pump from reaching the pump. Also, in order to increase the operation time between service periods, where the pool cleaner must be removed from the pool and the filter dismantled, emptied, and cleaned, it may be desirable that the filter be configured to hold as much debris as possible. However, it may also be important that the pool cleaner be small and light in order to facilitate handling. Thus, the size of a filter that is installed inside the body of the pool cleaner may be limited. On the other hand, placement of a single larger filter externally to the body the pool cleaner could require placing the filter downstream of the pump, so that the dirt and debris that is drawn into the pool cleaner may damage or clog the pump or pump components.

A dual filter in accordance with an embodiment of the present invention may enable increasing the filtering capacity or volume of a small and light pool cleaner. For example, since the inlet filter is configured to trap debris pieces upstream of the pump, the size of the outlet filter that is downstream of the pump may be increased, e.g., to extend outside of the body of the pool cleaner.

In some cases, both the inlet filter and the outlet filter are enclosed within the housing of the pool cleaner. For example, the meshes or downstream walls of one or both of the inlet filter and the outlet filter may have a generally concave shape with the concavity facing upstream. Thus, debris that is trapped by the filter may be within a volume (referred to herein as a "chamber") that is delimited by one or more of the mesh or other walls. In some cases, the shape of the inlet or outlet filter may conform to that of an interior wall of the cleaner housing, thus enabling the cleaner housing to hold the filter in place.

In some cases, the outlet filter may extend at least partially outside of the cleaner housing. For example, a convex or otherwise shaped outer surface of a rigid mesh of the outlet filter may extend outside of the cleaner housing, or an outlet filter that includes a porous flexible bag may extend mostly or completely outside of the cleaner housing.

FIG. 1 schematically illustrates a pool cleaner with a dual filter, in accordance with an embodiment of the present invention.

At least some components of dual-filter pool cleaner 10 are enclosed within cleaner housing 12. For example, cleaner housing 12 may be constructed of one or more materials such as plastic, metal, ceramic, or other materials that may be impermeable to a liquid in which dual-filter pool cleaner 10 may be completely or partially submerged.

A propulsion system of dual-filter pool cleaner 10 includes drive motor 40. Drive motor 40 may be configured to apply torque to one or more drive wheels 42 to propel dual-filter pool cleaner 10 along an interior surface of a pool. In some cases, one or more of drive wheels 42 may include a track or other structure for increasing traction between drive wheels 42 and a pool surface, or to facilitate adaptation to differently contoured pool surfaces.

For example, drive motor 40 may apply torque to drive wheels 42 via a transmission 44. Transmission 44 may include one or more gears, pulleys, belts, or other components to transfer a torque that is generated by drive motor 40 to drive wheels 42. In some cases, transmission 44 may enable two drive wheels 42 on different sides of dual-filter pool cleaner 10 to rotate at different rates, e.g., to turn or steer dual-filter pool cleaner 10. Alternatively or in addition to drive wheels 42, a propulsion system may include one or more propellers, fins or wings, jets, or other structure for propelling dual-filter pool cleaner 10 within a pool.

A suction system of dual-filter pool cleaner 10 may include suction pump 26, inlet filter chamber 14, and outlet filter chamber 16.

Liquid from the pool may enter inlet filter chamber 14 via one or more inlet openings 20. Each inlet opening 20 may be provided with a one-way inlet valve 22. For example, one-way inlet valve 22 may include an inwardly foldable flap, as in the example shown, or any other type of one-way valve or structure that may allow inflow of liquid into inlet filter chamber 14 via inlet opening 20 but that prevents outflow of the liquid from inlet filter chamber 14 out through inlet opening 20. One-way inlet valve 22 may be configured (e.g., with a sufficiently wide opening distance) to enable pieces of debris to enter inlet filter chamber 14 together with the liquid. One-way inlet valve 22 may be incorporated into a wall of inlet filter chamber 14, into a bottom surface of cleaner housing 12, or both or elsewhere. In some cases, one-way inlet valve 22 (e.g., in the form of a flap or hinged cover) may include a spring or other mechanism to close one-way inlet valve 22 when there is no inflow of liquid through inlet opening 20, or when dual-filter pool cleaner 10 is oriented such that gravity does not close one-way inlet valve 22.

Inlet filter chamber 14 includes coarse mesh 18. Liquid that is impelled by suction pump 26 may flow out of inlet filter chamber 14 via coarse mesh 18 and into liquid conduit 24. For example, openings in coarse mesh 18 may be sufficiently small so as to trap coarse pieces of debris (e.g., having a dimension that is larger than a predetermined length). For example, a typical dimension of an opening in coarse mesh 18 may be greater than one millimeter (e.g., in the range of from about one to five millimeters, or another size).

Inlet filter chamber 14 may be openable or removable from dual-filter pool cleaner 10 in order to empty the contents of inlet filter chamber 14 and to clean coarse mesh 18. For example, inlet filter chamber 14 may be constructed as a unit that is removable from dual-filter pool cleaner 10. In some cases, a removable inlet filter chamber 14 may be attached to cleaner housing 12 by one or more clips or by another attachment mechanism. Outlet 23 of inlet filter chamber 14 may include a neck or other structure that is configured to fit tightly to liquid conduit 24. After removal, inlet filter chamber 14 may be opened or partially disassembled (e.g., coarse mesh 18 may be removed or one-way inlet valve 22 may be opened, or inlet filter chamber 14 may be otherwise opened or disassembled) to enable emptying the contents of inlet filter chamber 14 or cleaning the interior of inlet filter chamber 14. As another example, one or more panels or doors of cleaner housing 12 may be opened to enable access to inlet filter chamber 14. Alternatively or in addition, one or more latches or other holding structure, e.g., on cleaner housing 12 or interior to dual-filter pool cleaner 10, may be opened or removed to enable removal of inlet filter chamber 14 from dual-filter pool cleaner 10. Alternatively or in addition, the interior of inlet filter chamber 14 and of coarse mesh 18 may be accessible via inlet openings 20 to enable the interior of inlet filter chamber 14 to be emptied or cleaned.

Suction pump 26 may include one or more motorized impellers that, when operated, e.g., rotated, are configured to impel liquid through liquid conduit 24 in the direction from inlet filter chamber 14 toward outlet filter chamber 16. Liquid conduit 24 may be configured to enable efficient (e.g., directed or non-turbulent) flow between inlet filter chamber 14 and outlet filter chamber 16. For example, as illustrated schematically in the example shown, suction pump 26 may include a pump motor 25 that is configured to rotate an impeller in the form of a top-mounted axial-flow pump propeller 28 that is configured to rotate about a vertical axis (or another axis parallel to liquid flow through liquid conduit 24) and is located on a top downstream side of pump motor 25. Other configurations of impellers are possible, some of which are described below in more detail.

Coarse mesh 18 of inlet filter chamber 14 may prevent the flow of coarse pieces of debris through liquid conduit 24 to suction pump 26. Prevention of the flow of coarse debris pieces may protect components of suction pump 26, such as top-mounted axial-flow pump propeller 28 or other components, from potential damage from impact with such flowing debris pieces, or from such debris pieces becoming lodged in a mechanism of suction pump 26.

Liquid may flow from liquid conduit 24 into outlet filter chamber 16 via one or more outlet filter inlet openings 30. Outlet filter inlet opening 30 may be provided with a one-way inlet valve 32. For example, one-way inlet valve 32 may include an outwardly (e.g., outward from liquid conduit 24 and into outlet filter chamber 16) foldable flap, as illustrated schematically in the example shown, or any other type of one-way valve or structure that may allow outflow of liquid from liquid conduit 24 into outlet filter chamber 16 via outlet filter inlet opening 30 but that prevents backflow of the liquid into liquid conduit 24 from outlet filter chamber 16. In some cases, one-way valve 32 (e.g., in the form of a flap or hinged cover) may include a spring or other mechanism to close one-way valve 32 when there is no outflow of liquid through outlet filter inlet opening 30, or when dual-filter pool cleaner 10 is oriented such that gravity does not close one-way valve 32.

Outlet filter chamber 16 includes fine mesh 36. Liquid that is impelled by suction pump 26 may flow out of outlet filter chamber 16 via fine mesh 36 and outlet opening 38 back into the pool. For example, openings in fine mesh 36 may be sufficiently small so as to trap fine particles of debris (e.g., any dirt or other particles that are suspended in the liquid and that are to be removed so as to clean the pool and its liquid contents). For example, a typical dimension of an opening in fine mesh 36 may be less than one millimeter. Fine mesh 36 may include a conventional plastic or metal mesh filter, may include a porous cloth or bag, honeycomb plastic or metal, carbon, graphene, or another material or structure known to trap fine debris. Furthermore, outlet filter chamber 16 or fine mesh 36 may include or dispense a germicidal or antibacterial material that may be released into the liquid as it flows back into the pool.

Outlet filter chamber 16 may be openable or removable from dual-filter pool cleaner 10 in order to empty the contents of outlet filter chamber 16 and to clean fine mesh 36. For example, outlet filter chamber 16 may be constructed as a unit that is removable from dual-filter pool cleaner 10. After removal, outlet filter chamber 16 may be opened or partially disassembled (e.g., fine mesh 36 may be removed or one-way valve 32 may be opened, or outlet filter chamber 16 may be otherwise opened or disassembled) to enable emptying the contents of outlet filter chamber 16 or cleaning the interior of outlet filter chamber 16. As another example, one or more panels or doors of cleaner housing 12 may be opened to enable access to outlet filter chamber 16. Alternatively or in addition, one or more latches or other holding structure, e.g., on cleaner housing 12 or interior to dual-filter pool cleaner 10, may be opened or removed to enable removal of outlet filter chamber 16 from dual-filter pool cleaner 10. In some cases, outlet filter chamber 16 may include a single-use or disposable bag or other type of container. Outlet filter inlet opening 30 of outlet filter chamber 16 may include a neck or other structure that is configured to fit tightly to liquid conduit 24.

Operation of one or more of drive motor 40, transmission 44, or suction pump 26 may be controlled by controller 46. For example, controller 46 may include a processor that is configured to determine a manner of autonomous or semi-autonomous (e.g., autonomous operation in response to one or more operator commands) operation of dual-filter pool cleaner 10 in accordance with programmed instructions. Alternatively or in addition, controller 46 may include circuitry to enable fully manual or assisted manual operation of dual-filter pool cleaner 10 (e.g., via a remote controller, computer, or other device that is in wired or wireless communication with controller 46).

Components of dual-filter pool cleaner 10, such as one or more of pump motor 25, drive motor 40, controller 46, or other components may be powered by an electric power supply 47. For example, electric power supply 47 may include one or more of a storage battery, a connection to an external power supply, a solar cell, or other source of electrical power.

A dual-filter pool cleaner 10 may include one or more types or variations of suction pump 26.

Figure 2A:
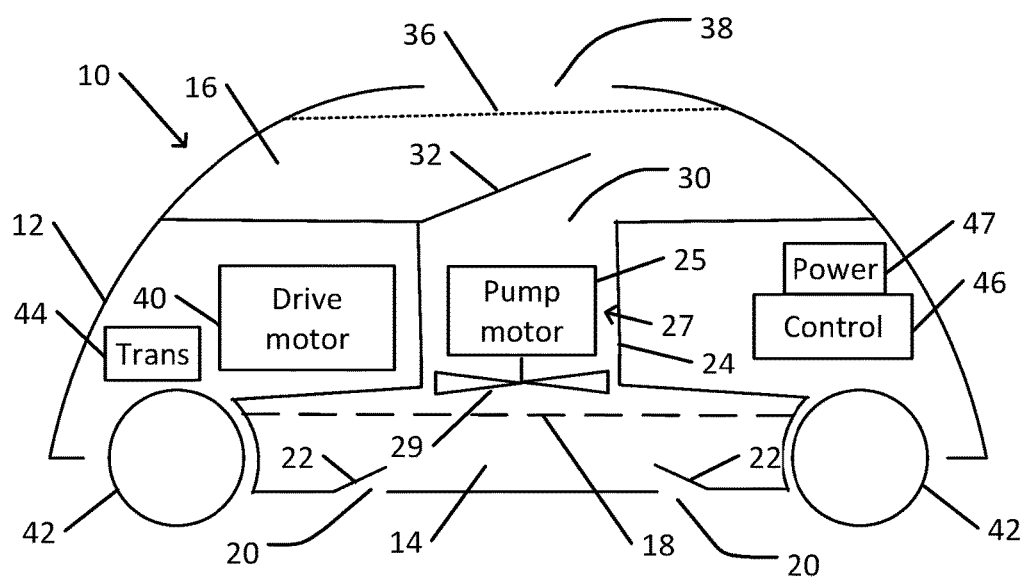
FIG. 2A schematically illustrates a variant of the dual-filter pool cleaner shown in FIG. 1, where the suction pump includes a vertical axial-flow pump with a bottom-mounted propeller.

FIG. 2A schematically illustrates a variant of the dual-filter pool cleaner shown in FIG. 1, where the suction pump includes a vertical axial-flow pump with a bottom-mounted propeller.

In the example shown, bottom propeller axial-flow pump 27 includes a bottom-mounted propeller 29 that is configured to rotate about a vertical axis (or other axis parallel to liquid flow through liquid conduit 24). In the example shown, bottom propeller axial-flow pump 27 is mounted below (e.g., upstream of) pump motor 25. Bottom propeller axial-flow pump 27 may be advantageous for operation in a shallow pool, or a shallow part of a pool. For example, a depth of a liquid in such a shallow pool may be sufficient to submerge bottom-mounted propeller 29. In such a shallow pool, a propeller or other impeller that is mounted higher (e.g., above pump motor 25) within dual-filter pool cleaner 10 may be above the level of the liquid. In some cases, the position of bottom-mounted propeller 29 close to inlet opening 20 may enable a greater suction force, and greater stability (e.g., lower center of gravity) than an impeller that is located further from inlet opening 20.

Figure 2B:
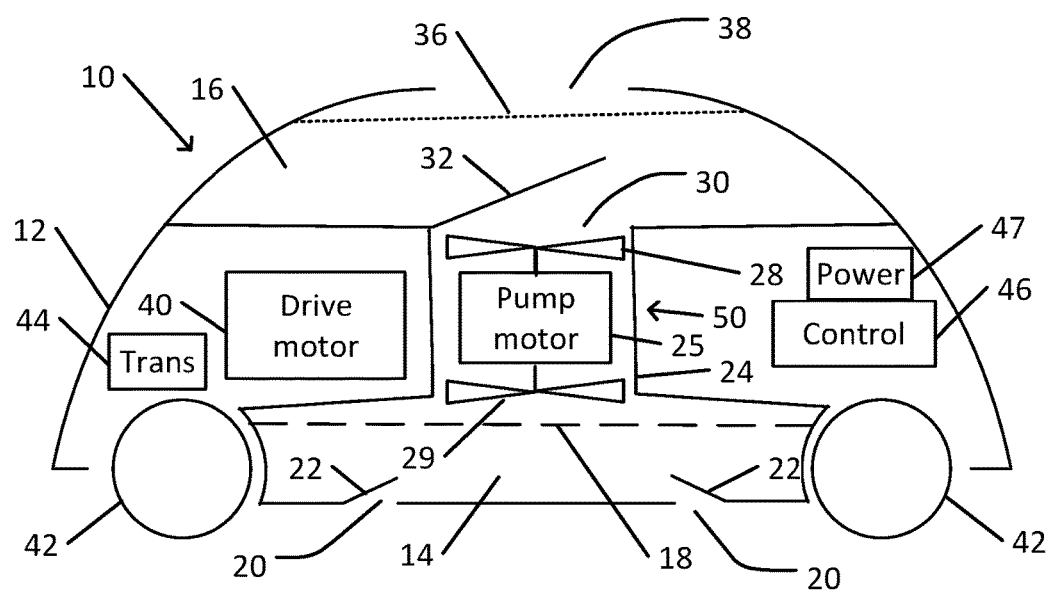
FIG. 2B schematically illustrates a variant of the dual-filter pool cleaner shown in FIG. 1, where the suction pump includes a vertical axial-flow pump with two propellers.

FIG. 2B schematically illustrates a variant of the dual-filter pool cleaner shown in FIG. 1, where the suction pump includes a vertical axial-flow pump with multiple propellers.

In the example shown, multiple propeller axial-flow pump 50 includes two propellers in the form of top-mounted axial-flow pump propeller 28 and bottom-mounted propeller 29. A multiple propeller axial-flow pump 50 may be advantageous as providing a greater suction force than a pump with a single impeller. For example, multiple propeller axial-flow pump 50 may achieve the increased suction force without increasing the rotational speed of pump motor 25 or the size (e.g., diameter or length) of the impellers. This may enable a smaller overall size and weight of the suction pump and, thus, in some cases, of dual-filter pool cleaner 10.

In the example of multiple propeller axial-flow pump 50 that is shown, bottom-mounted propeller 29 is positioned upstream (e.g., below) pump motor 25, and another top-mounted axial-flow pump propeller 28 is located downstream (e.g., above) pump motor 25. For example, bottom-mounted propeller 29 and top-mounted axial-flow pump propeller 28 may be rotated by a single shaft of pump motor 25. In this case, the pitch of bottom-mounted propeller 29 may be opposite the pitch of top-mounted axial-flow pump propeller 28. As another example, a single pump motor 25 and a transmission, or two different pump motors 25, may be configured to rotate in opposite directions a bottom-mounted propeller 29 and a top-mounted axial-flow pump propeller 28 that are similarly pitched.

Alternatively or in addition, a multiple propeller axial-flow pump 50 may include two or more bottom-mounted propeller-like impellers 29, two or more top-mounted axial-flow pump propellers 28 mounted higher within dual-filter pool cleaner 10, or another combination of multiple propellers. Alternatively, a pump with multiple impellers may include one or more other types of impellers.

Figure 2C:
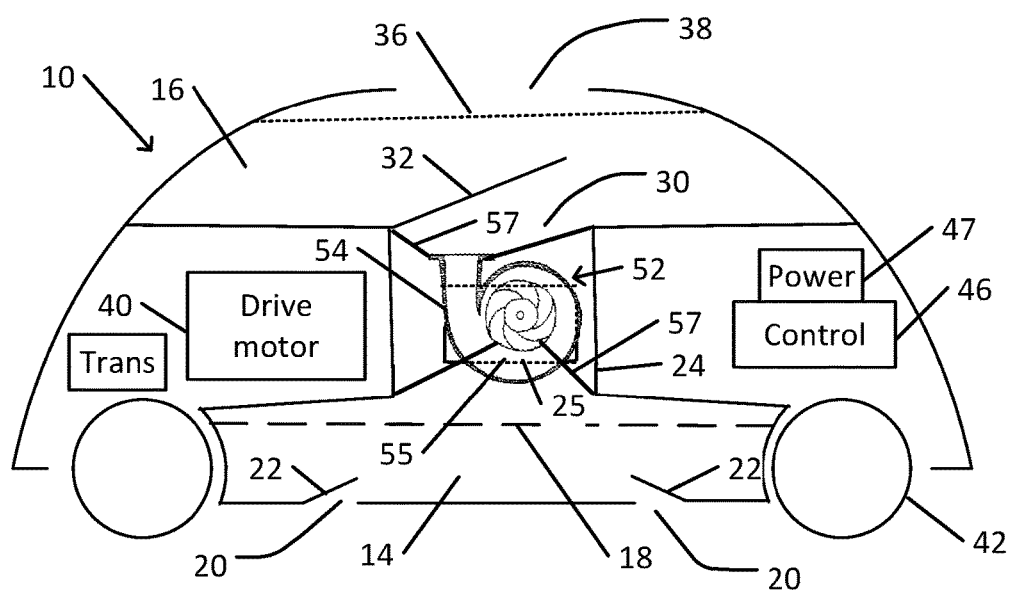
FIG. 2C schematically illustrates a variant of the dual-filter pool cleaner shown in FIG. 1, where the suction pump includes a vertically-mounted centrifugal pump.

FIG. 2C schematically illustrates a variant of the dual-filter pool cleaner shown in FIG. 1, where the suction pump includes a vertically-mounted centrifugal pump.

Vertically-mounted centrifugal pump assembly 52 includes a centrifugal pump impeller 54 that is vertically mounted so as to rotate about a horizontal axis. Since centrifugal pump impeller 54 is vertically mounted, pump motor 25 may be arranged such to rotate horizontally (e.g., perpendicularly to the plane rotation direction of rotor 55 of centrifugal pump impeller 54). Intake and outflow ports of centrifugal pump impeller 54 may be connected by ducts 57 to inlet filter chamber 14 and outlet filter chamber 16, respectively, e.g., to facilitate efficient flow within, or to replace, liquid conduit 24.

Figure 2D:
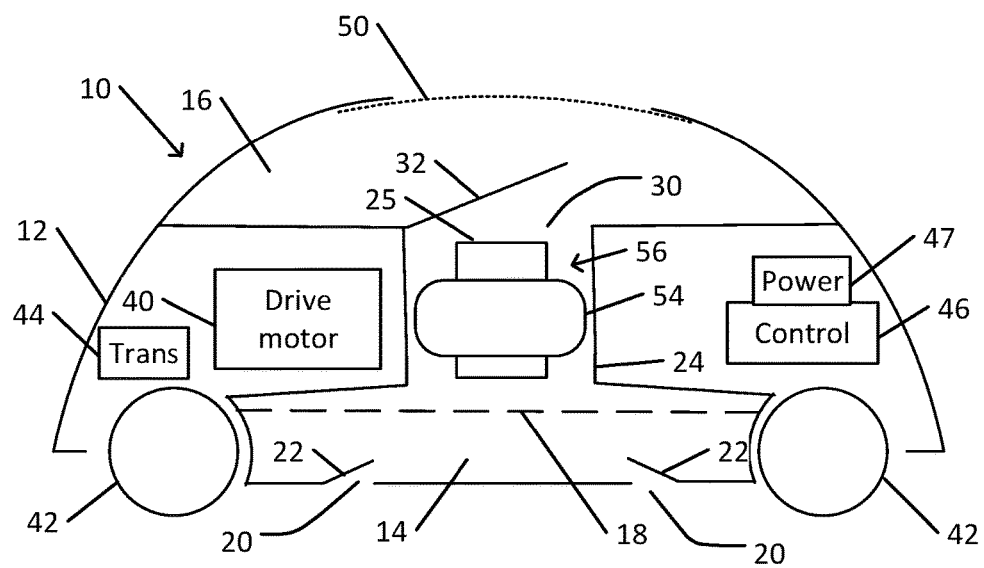
FIG. 2D schematically illustrates a variant of the dual-filter pool cleaner shown in FIG. 1, where the suction pump includes a horizontally-mounted centrifugal pump.

FIG. 2D schematically illustrates a variant of the dual-filter pool cleaner shown in FIG. 1, where the suction pump includes a horizontally-mounted centrifugal pump.

Horizontally-mounted centrifugal pump assembly 56 includes a centrifugal pump impeller 54 that is horizontally mounted so as to rotate about a vertical axis. Since centrifugal pump impeller 54 is horizontally mounted, pump motor 25 may be arranged so as to rotate vertically (e.g., as in the case of pump motor 25 in suction pump 25 as shown in FIG. 1, bottom propeller axial-flow pump 27 in FIG. 2A, or multiple propeller axial-flow pump 50 in FIG. 2B).

In some cases, selection of a vertically mounted centrifugal pump impeller 54 and horizontally rotating pump motor 25 of a horizontally mounted centrifugal pump impeller 54 and vertically rotating pump motor 25 may be determined by size or other design considerations (e.g., of cleaner housing 12 or another part of dual-filter pool cleaner 10), or by other considerations.

Figure 2E:
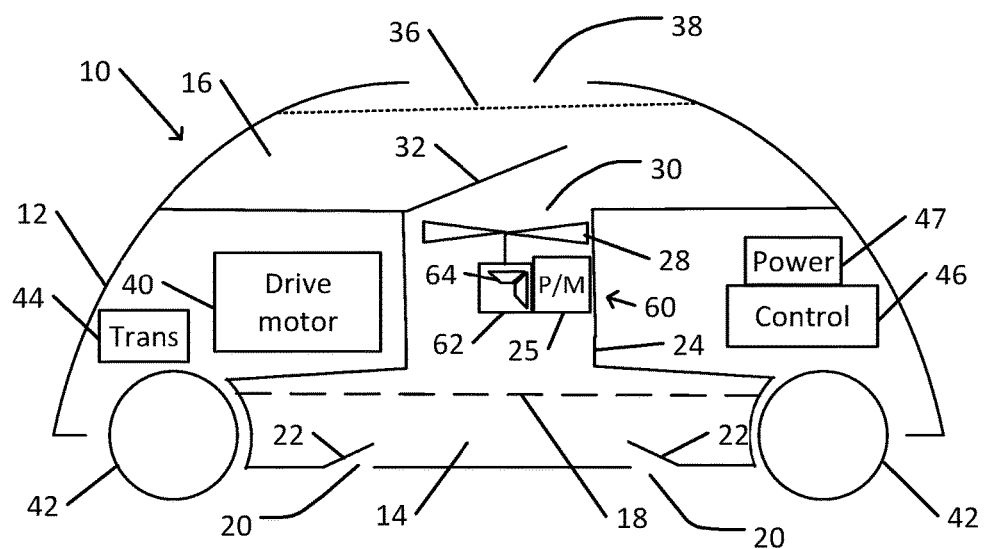
FIG. 2E schematically illustrates a variant of the dual-filter pool cleaner shown in FIG. 1, where the suction pump includes a vertical axial-flow pump and a pump motor with a horizontal axis of rotation.

FIG. 2E schematically illustrates a variant of the dual-filter pool cleaner shown in FIG. 1, where the suction pump includes a vertical axial-flow pump and a pump motor with a horizontal axis of rotation.

In horizontal motor pump 60, pump motor 25 is configured to rotate an impeller (a top-mounted axial-flow pump propeller 28 in the example shown, or another type of impeller) about a vertical axis. Pump motor 25 is mounted so that the axis of rotation of its shaft is horizontal, e.g., about an axis that is substantially perpendicular to the axis of rotation of the impeller. Pump transmission 62 is configured to transmit torque about a horizontal axis that is generated by pump motor 25 to the vertical axis of the impeller. For example, pump transmission 62 may include a bevel gear arrangement, as in the example shown, or another arrangement of gears, pulleys, belts, or other components that may be configured to transmit a torque about one axis to another, perpendicular axis.

A pump motor 25 with a horizontal rotation axis, together with a pump transmission 62, may, in some cases, be advantageous over similarly configured (e.g., with same type of pump and similarly configured inlet filter chamber 14 and outlet filter chamber 16) dual-filter pool cleaner 10 having a pump motor 25 with a vertical axis of rotation. For example, the horizontally rotating pump motor 25 may enable design of a dual-filter pool cleaner 10 with a lower profile than could be achieved with a vertically rotating pump motor 25.

Although, in the example shown, the vertically rotating impeller includes a single top-mounted axial-flow pump propeller 28, the vertically rotating impeller may include a bottom-mounted propeller 29, both an upper top-mounted axial-flow pump propeller 28 and a bottom-mounted propeller 29 (e.g., with pump transmission 62 including a double bevel-gear arrangement), a horizontal centrifugal pump impeller 54, or another type of impeller that is configured to rotate about a vertical axis.

In some cases, an outlet filter and its mesh may be shaped so as to appear to be an integral part of cleaner housing 12.

Figure 3:
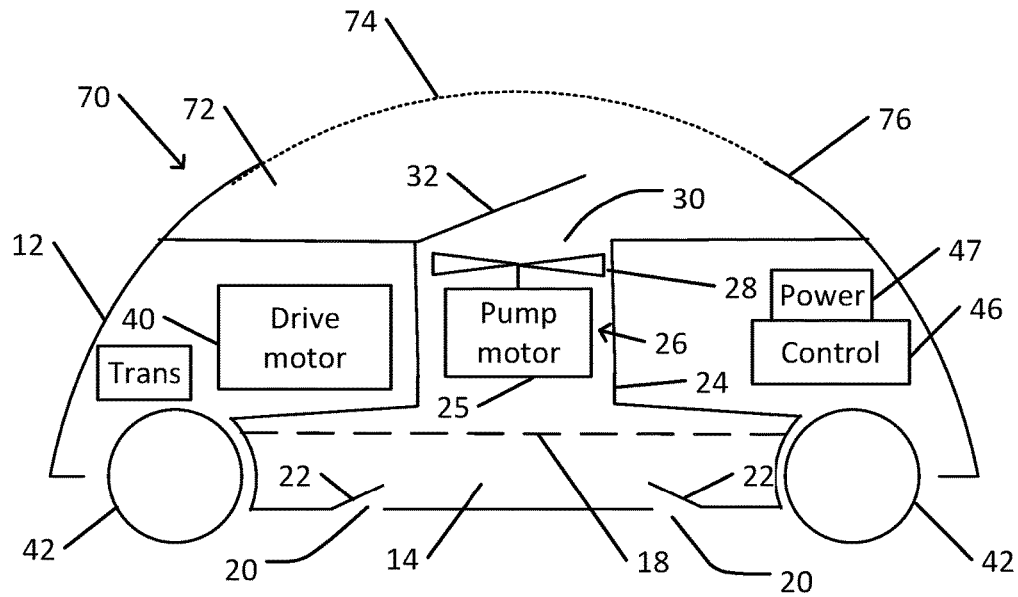
FIG. 3 schematically illustrates a variant of the dual-filter pool cleaner shown in FIG. 1, with an outlet filter that is contoured to conform to the housing of the pool cleaner.

FIG. 3 schematically illustrates a variant of the dual-filter pool cleaner shown in FIG. 1, with an outlet filter that is contoured to conform to the housing of the pool cleaner.

Dual-filter pool cleaner 70 includes contoured outlet filter chamber 72. In the example shown, top surface 76 of contoured outlet filter chamber 72 is shaped so as to continue the contour of cleaner housing 12.

Part or all of top surface 76 may include contoured fine mesh 74. For example, part or all of contoured fine mesh 74 may continue a contour of cleaner housing 12. Alternatively or in addition, part or all of top surface 76 may include one or more openings to enable liquid to flow to the exterior of dual-filter pool cleaner 70 via contoured fine mesh 74.

Dual-filter pool cleaner 70 may thus appear as a single integral unit. Dual-filter pool cleaner 70 with contoured outlet filter chamber 72 may be storable in a smaller space than another configuration of a dual-filter pool cleaner.

In some cases, an outlet filter and its mesh may be mounted externally to cleaner housing 12.

Figure 4:
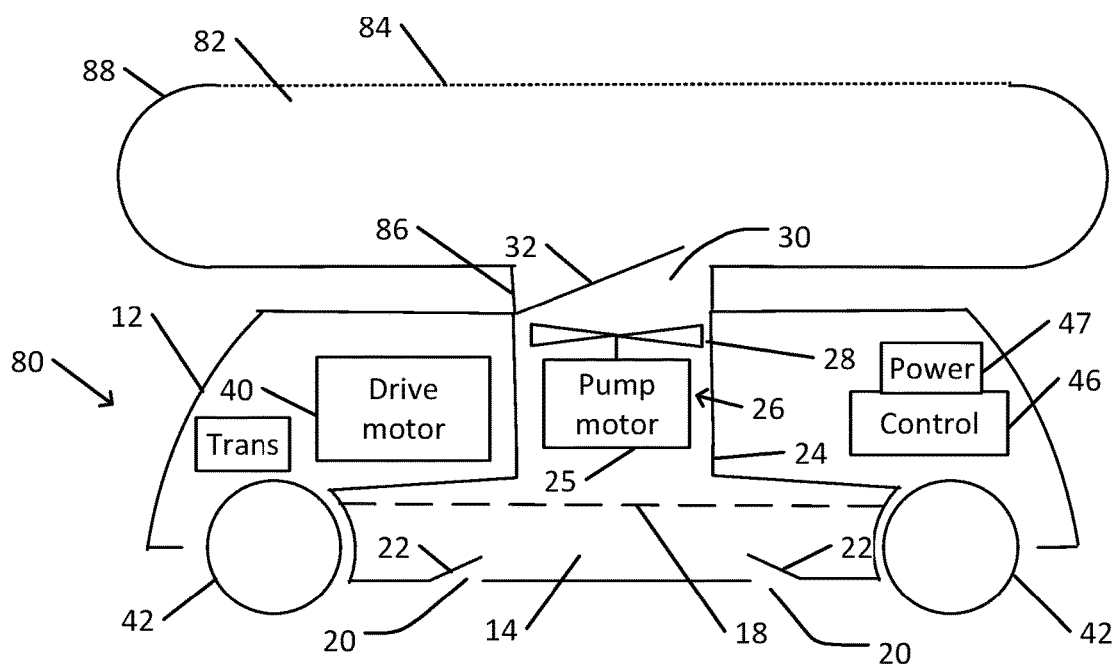
FIG. 4 schematically illustrates a variant of the dual-filter pool cleaner shown in FIG. 1, with an external outlet filter.

FIG. 4 schematically illustrates a variant of the dual-filter pool cleaner shown in FIG. 1, with an external outlet filter.

External dual-filter pool cleaner 80 includes an external outlet filter chamber 82 that is completely or partially located outside of cleaner housing 12. Since at least part of external outlet filter chamber 82 is located outside of cleaner housing 12, the size of external outlet filter chamber 82 is not limited by the size of cleaner housing 12. Thus, external outlet filter chamber 82 may be larger than would an outlet filter chamber that is confined by cleaner housing 12. In this case, the maximum size of external outlet filter chamber 82 may be determined by design considerations other than the size of cleaner housing 12. Such design considerations may include, for example, an amount of debris that is expected to be collected in a pool during a cleaning session, a maximum weight or volume that may be reliably and stably transported by the propulsion system of external dual-filter pool cleaner 80, a depth of a pool that is to be cleaned by external dual-filter pool cleaner 80, a pumping capability of a suction system of external dual-filter pool cleaner 80, considerations related to storage, ergonomics, or esthetics, or other design considerations.

Since external outlet filter chamber 82 is at least partially located outside of cleaner housing 12, the size or number of other components of external dual-filter pool cleaner 80 that are enclosed within a similarly sized cleaner housing 12 may be larger than with another configuration. For example, the size or number of storage batteries of power supply 47 may be increased over that of another configuration, or the size (e.g., and thus the torque) of one or both of drive motor 40 or pump motor 25 may be increased.

In some cases, two or more different configurations of external outlet filter chambers 82 may be alternately mounted on external dual-filter pool cleaner 80. For example, a particular configuration external outlet filter chamber 82 may be selected for a particular cleaning session. The selection of a particular external outlet filter chamber 82 may be based on considerations such as the dimensions of a pool to be cleaned, the amount of debris that is in the pool, the expected duration of the cleaning session, environmental conditions (e.g., presence or people or pets in the area, weather conditions, or other environmental considerations), operator preference, or other considerations.

For example, external outlet filter chamber 82 may include filter neck 86 for connecting to cleaner housing 12 of external dual-filter pool cleaner 80. Filter neck 86 may include structure that enables attachment of external outlet filter chamber 82 to cleaner housing 12. For example, filter neck 86 may include one or more latches, belts, clips, bands, tabs, or other connection structure to securely attach external outlet filter chamber 82 to cleaner housing 12.

In the example shown, part of the outer wall of external outlet filter chamber 82 includes an impermeable section 88 through which a liquid from the pool cannot flow. Another part of the outer wall of external outlet filter chamber 82 includes fine mesh wall 84 which enables the liquid to exit while trapping suspended debris. In other examples, the outer wall of external outlet filter chamber 82 may include mostly or entirely fine mesh wall 84. In other examples, the outer wall of external outlet filter chamber 82 may include two or more sections of fine mesh wall 84 that are separated by one or more impermeable sections 88.

In some cases, external outlet filter chamber 82 may include rigid walls (e.g., formed by one or more rigid fine mesh walls 84), impermeable sections 88, or both. In some cases, external outlet filter chamber 82 may be flexible. For example, external outlet filter chamber 82 may be in the form of a flexible bag (e.g., made of or including a flexible plastic or cloth mesh) that collapses when empty and swells (e.g., without stretching) when filled. In some cases, external outlet filter chamber 82 may be in the form of an elastic bag (e.g., made of or including an elastic mesh material) that deflates when empty but inflates and stretches when filled. In some cases, external outlet filter chamber 82 may include rigid walls with at least one flexible or elastic section.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A pool cleaner comprising:
    a housing, comprising at least one fluid inlet and at least one fluid outlet;
    a propulsion system for propelling the pool cleaner within a pool;
    a suction system comprising a motorized pump, the suction system being configured to draw liquid containing debris from the pool through the at least one fluid inlet, and to expel the liquid back into the pool through the at least one fluid outlet;
    a first filter located between the at least one fluid inlet and the pump; and
    a second filter located downstream of the pump, such that the pump is located between the first filter and the second filter,
    wherein the first filter is configured to trap debris pieces that are larger than a predetermined size to prevent the debris pieces from flowing to the pump, and the second filter is configured to trap the debris that has passed through the first filter.

2. The pool cleaner of claim 1, wherein the pump comprises an axial-flow pump with a propeller that is located upstream of a motor of the pump.

3. The pool cleaner of claim 1, wherein the pump is an axial-flow pump comprising a propeller that is located downstream of a motor of the pump.

4. The pool cleaner of claim 3, wherein the pump comprises a second propeller that is located upstream of the motor.

5. The pool cleaner of claim 1, wherein the pump comprises an axial-flow pump with a propeller, and a pump motor shaft is configured to generate torque about an axis that is substantially perpendicular to an axis of rotation of the propeller.

6. The pool cleaner of claim 5, wherein a transmission for transmitting torque from the motor to the propeller comprises a bevel gear.

7. The pool cleaner of claim 1, wherein the pump comprises a centrifugal pump.

8. The pool cleaner of claim 7, wherein an impeller of the centrifugal pump is configured to rotate about a horizontal axis.

9. The pool cleaner of claim 7, wherein an impeller of the centrifugal pump is configured to rotate about a vertical axis.

10. The pool cleaner of claim 7, further comprising a duct to connect an inlet of the centrifugal pump to an outlet of the first filter, or a duct to connect an outlet of the centrifugal pump to an inlet of the second filter.

11. The pool cleaner of claim 1, wherein an inlet opening to the first filter is provided with a one-way valve to enable inflow of the liquid to the first filter via the inlet opening and to prevent outflow of the liquid from the first filter via the inlet opening.

12. The pool cleaner of claim 1, wherein an inlet opening to the second filter is provided with a one-way valve to enable inflow of the liquid to the second filter via the inlet opening, and to prevent outflow of the liquid from the second filter via the inlet opening.

13. The pool cleaner of claim 1, wherein the second filter is at least partially enclosed within the housing.

14. The pool cleaner of claim 1, wherein the second filter is entirely outside the housing.

15. The pool cleaner of claim 1, wherein the second filter is contoured to conform to a shape of a top surface of the housing.

16. The pool cleaner of claim 1, wherein an inlet opening to the second filter is configured to fit to and maintain frictional contact with an outlet of the housing.

\* \* \* \* \*